US 8,814,190 B2

(12) United States Patent
Becher et al.

(10) Patent No.: US 8,814,190 B2
(45) Date of Patent: *Aug. 26, 2014

(54) COMPRESSED AIR SUPPLY ASSEMBLY AND CONTROL METHOD (71) Applicant: WABCO GmbH, Hannover (DE)

(72) Inventors: Hans-Otto Becher, Hannover (DE); Jorg Meier, Hessisch Oldendorf (DE); Uwe Stabenow, Laatzen (DE)

(73) Assignee: WABCO GmbH, Hannover (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/738,467

(22) Filed: Jan. 10, 2013

(65) Prior Publication Data
US 2013/0195682 A1 Aug. 1, 2013

(30) Foreign Application Priority Data

Jan. 31, 2012 (DE) .................. 10 2012 001 736

(51) Int. Cl.
*B60G 11/27* (2006.01)
*B60G 17/052* (2006.01)
*B60G 17/056* (2006.01)
*F04B 7/02* (2006.01)

(52) U.S. Cl.
CPC ........... *F04B 7/02* (2013.01); *B60G 2500/2021* (2013.01); *B60G 2500/2044* (2013.01); *B60G 17/0523* (2013.01); *B60G 17/0565* (2013.01); *B60G 2500/204* (2013.01)
USPC .................. 280/124.16; 137/487.5; 137/597; 267/64.28; 280/5.514; 280/6.157

(58) Field of Classification Search
CPC ........... B60G 17/0155; B60G 17/0525; B60G 17/0528; B60G 17/056; B60G 17/0565; B60G 17/0523; B60G 2202/152; B60G 2202/154; B60G 2500/302; B60G 2500/2042; B60G 2500/2044

USPC .................. 137/12, 487.5, 565.18, 597, 613, 137/624.13, 624.15; 180/41; 267/64.28; 280/5.514, 6.157, 124.16
See application file for complete search history.

(56) References Cited

U.S. PATENT DOCUMENTS 4,695,074 A * 9/1987 Kobayashi et al. ........ 280/6.157
4,709,934 A * 12/1987 Suzuki et al. ............... 280/6.157
(Continued)

FOREIGN PATENT DOCUMENTS

DE 198 35 491 2/2000
DE 102 23 405 12/2003
(Continued)

*Primary Examiner* — Paul N Dickson
*Assistant Examiner* — Laura Freedman
(74) *Attorney, Agent, or Firm* — Kramer Levin Naftalis & Frankel LLP (57) ABSTRACT A compressed air supply assembly for operating a pneumatic assembly includes a compressed air supply; a compressed air connection to the pneumatic assembly; a purge connection to the environment; a pneumatic main line between the compressed air supply and the compressed air connection comprising an air dryer; a purge line between the compressed air connection and the purge connection; and a solenoid valve arrangement with a control valve to control a purge valve. The control valve is connected to a control valve connection in a pneumatic control line connected to a pressure control connection of the purge valve, and the purge valve is connected to a purge valve connection in the purge line. A pressure-maintaining device is connected to the pneumatic control line and maintains control pressure at the pressure control connection when the purge valve connection is open, independently of pressure in the purge line and/or the main line.

24 Claims, 4 Drawing Sheets (56) References Cited

U.S. PATENT DOCUMENTS

| | | | |
|---|---|---|---|
| 4,755,196 A * | 7/1988 | Frania et al. | 96/116 |
| 4,881,753 A * | 11/1989 | Shima et al. | 280/6.157 |
| 5,048,867 A * | 9/1991 | Gradert | 280/6.159 |
| 5,600,953 A * | 2/1997 | Oshita et al. | 60/453 |
| 5,711,150 A * | 1/1998 | Oshita et al. | 60/407 |
| 6,116,586 A * | 9/2000 | Westerkamp et al. | 267/64.28 |
| 6,266,590 B1 * | 7/2001 | Kutscher et al. | 701/37 |
| 6,332,623 B1 | 12/2001 | Behmenburg et al. | |
| 6,354,617 B1 * | 3/2002 | Behmenburg et al. | 280/124.157 |
| 6,623,016 B2 * | 9/2003 | Sulzyc et al. | 280/5.514 |
| 6,726,189 B2 * | 4/2004 | Folchert et al. | 267/64.16 |
| 6,726,224 B2 * | 4/2004 | Jurr et al. | 280/5.514 |
| 6,799,950 B2 * | 10/2004 | Meier et al. | 417/12 |
| 6,817,600 B2 | 11/2004 | Ocker et al. | |
| 6,845,988 B2 * | 1/2005 | Romer et al. | 280/5.514 |
| 7,255,358 B2 * | 8/2007 | Kim | 280/124.16 |
| 7,331,592 B2 * | 2/2008 | Heer | 280/124.16 |
| 7,552,932 B2 * | 6/2009 | Matern et al. | 280/124.16 |
| 8,447,466 B2 * | 5/2013 | Meier et al. | 701/36 |
| 8,490,641 B2 * | 7/2013 | Schnittger et al. | 137/115.25 |
| 2012/0073669 A1 | 3/2012 | Diekmeyer | |
| 2013/0042932 A1 * | 2/2013 | Bodet et al. | 137/544 |
| 2013/0062541 A1 * | 3/2013 | Diekmeyer et al. | 251/12 |
| 2013/0192681 A1 * | 8/2013 | Meier | 137/2 |
| 2013/0255609 A1 * | 10/2013 | Frank et al. | 123/90.14 |
| 2013/0255787 A1 * | 10/2013 | Frank et al. | 137/1 |
| 2013/0276899 A1 * | 10/2013 | Frank et al. | 137/1 |
| 2013/0318954 A1 * | 12/2013 | Frank et al. | 60/407 |
| 2013/0320639 A1 * | 12/2013 | Frank et al. | 280/5.514 |
| 2013/0320645 A1 * | 12/2013 | Gall | 280/124.16 |

FOREIGN PATENT DOCUMENTS

| | | |
|---|---|---|
| DE | 10 2009 029 898 | 12/2010 |
| EP | 0 978 397 | 2/2000 |
| EP | 1 165 333 | 1/2002 |

\* cited by examiner

FIG. 4

COMPRESSED AIR SUPPLY ASSEMBLY AND CONTROL METHOD

CROSS-REFERENCE TO RELATED APPLICATION

This application claims the benefit of DE 10 2012 001 736.7 filed on Jan. 31, 2012, the disclosure of which is hereby incorporated herein by reference in its entirety.

FIELD OF THE INVENTION

The present invention generally relates to a compressed air supply assembly for operating a pneumatic assembly, such as, for example, an air spring assembly of a vehicle.

BACKGROUND OF THE INVENTION

Compressed air supply assemblies are used in vehicles of all types to supply vehicle air spring assemblies with compressed air. Air spring assemblies can comprise level control devices that can be used to adjust the distance between the vehicle axle and vehicle superstructure. An air spring assembly of such a pneumatic system comprises a number of air bellows pneumatically connected to a common line (gallery) and can raise the vehicle superstructure as fill levels increase and lower it as fill levels decrease. As the distance between the vehicle axle and the vehicle superstructure, or the ground clearance, increases, the spring travel becomes longer and greater ground unevenness can be overcome without contact with the vehicle superstructure. Such systems are used in off-road vehicles and sport utility vehicles (SUVs). In SUVs with very powerful engines, it is desirable to provide the vehicle with comparatively low ground clearance for high speed road travel, and with comparatively high ground clearance for off-road use. It is furthermore desirable to implement the change in ground clearance as quickly as possible, which increases the requirements with regard to speed, flexibility and reliability of a compressed air assembly.

A compressed air supply assembly for use in a pneumatic system with a pneumatic assembly, for example an air spring assembly of the general type discussed above, is operated with compressed air from a compressed air supply, for example within a pressure range from 5 to 20 bar. The compressed air is provided to the compressed air supply by means of an air compressor, for example a compressor or where applicable a double compressor. To supply the pneumatic assembly, the compressed air supply is pneumatically connected with a compressed air connection and on the other side is pneumatically connected with a purge connection. Via a solenoid valve arrangement forming a purge valve arrangement, by allowing the air to escape into one or more purge connections, the compressed air supply assembly can be purged to the environment.

Providing an air dryer to dry the compressed air supplied to the system ensures long-term operation of the compressed air supply assembly. That is, the air dryer prevents the accumulation of moisture in the pneumatic system, which otherwise could lead to valve-damaging crystal formation at comparatively low temperatures and also to undesirable defects in the compressed air supply assembly and in the pneumatic assembly. An air dryer has a drying medium, normally a granulate bulk product through which the compressed air can flow so that, at comparatively high pressure, the granulate can absorb the moisture contained in the compressed air. An air dryer can, where applicable, also be designed as a regenerative air dryer, whereby, in each purge cycle, at comparatively low pressure, the dried compressed air from the air suspension system can flow through the granulate in the reverse direction or in the same direction relative to the filling direction. For this, the purge valve arrangement can be opened. For such an application, also known as pressure change adsorption, it is desirable to design the compressed air supply assembly to allow a comparatively rapid purging but nonetheless with a pressure change sufficient for regeneration of the air dryer. It is also desirable to carry out the purging process for a compressed air supply assembly with as high a purge pressure amplitude as possible, i.e., from an operating pressure to a purge pressure. However, the components of the solenoid valve arrangement should not be over-dimensioned or made too complex in construction.

So-called direct purge circuits—without control valve—can render superfluous the functionality of a solenoid valve arrangement of the type discussed above with control and purge valve. However, in such direct purge circuits, the nominal width of the purge valve must be designed to be comparatively large to allow rapid purging, but, at the same time, it is limited by the current absorption of a magnetic coil for the purge valve, so that, in the end, only limited switching pressure differences can be achieved.

EP 1 165 333 B2 describes a compressed air supply assembly of the general type discussed above, which comprises a solenoid valve arrangement with a control valve to control a purge valve. The control valve is connected with a valve connection in a control line that is connected to a pressure control connection of the purge valve. The purge valve is connected with a valve connection in the purge line. These and similar compressed air supply assemblies in principle allow rapid purge switching. The control valve is typically a 3/2-way valve and is switched by pressure provided by an air bellows of the pneumatic main line or by a control pressure taken from this. The control pressure, which can thus be delivered to the pressure control connection of the purge valve, actuates the opening of the valve connection of the purge valve in the purge line and thus initiates the purging of the compressed air supply assembly.

However, a disadvantage of compressed air supply assemblies that follow such a basic concept—such as for example the assemblies described in DE 102 23 405 B4 or EP 0 978 397 B1 or DE 10 2009 029 898 A1—is that a relay piston of the purge valve normally requires a closure-maintaining force provided by a valve spring, so that a residual pressure—and corresponding pre-control pressure—must be reserved in the system for the relay piston of the purge valve. The closure-maintaining force of the valve spring is required, for example, to enable the air compressor to deliver against comparatively high pressures. Also, the opening behavior of the purge valve must be taken into account for a residual pressure. These circumstances regularly lead to the reservation of a minimum bellows pressure required to constitute a pre-control pressure, for example in the range of one or a few bar, in order to be able to provide a fundamental purge functionality of the solenoid valve arrangement. Residual pressures can lie in the range from 1 or 2 to 3 bar, so that in a design of the compressed air supply assembly, a lower pressure limit for a bellows pressure of 3 bar or more must be defined. Despite such a design, depending on operating circumstances, partly closed valve cross sections can occur; these in turn can lead to a significantly reduced regeneration behavior in an air dryer and hence to unstable system operating states.

SUMMARY OF THE INVENTION

Generally speaking, it is an object of the present invention to provide a compressed air supply assembly, and a pneumatic system with a compressed air supply assembly, of uncomplicated construction, that, based on a solenoid valve arrangement with a control valve and a purge valve, provide improved, rapid purge functionality with comparatively high pressure amplitude.

It is also an object of the present invention to provide a method for controlling the inventive compressed air supply assembly and/or pneumatic assembly.

According to an embodiment of the present invention, a pressure-maintaining pneumatic device is connected to the control line. The device is configured to maintain a control pressure at the pressure control connection when the purge valve connection of the purge valve in the purge line is open, independently of a pressure in the purge line and/or the pneumatic main line. A connection to the control line also comprises a connection in the control line. The pressure-maintaining pneumatic device with a connection can be connected to the control line only with the one connection; to this extent it can only be connected unilaterally, as may be the case for example with a pressure accumulator, a pressure reservoir or a bellows or a compressor. Also a pneumatic device with two or more connections for maintaining pressure can be connected to the control line with the two connections, or, where applicable, multiple connections; to this extent it is integrated in the control line bilaterally as may be the case for example with a valve, in particular a 2/2-way valve. The valve can also comprise further connections that are not connected with the control line, as may be the case for example with a 3/2-way valve.

In accordance with another embodiment of the present invention, a pneumatic system includes the inventive compressed air supply assembly and a pneumatic assembly in the form of an air spring assembly, wherein the air spring assembly comprises a gallery with at least one bellows branch line and/or accumulator branch line pneumatically connected with the gallery, with a bellows and/or a pressure accumulator and/or a directional valve arranged before the bellows and/or pressure accumulator.

It will be appreciated that the present invention is based on the consideration that, while the conventional solenoid valve arrangement with a control valve to control a purge valve in a compressed air supply assembly has proved successful in principle, the use of a bellows pressure present in a pneumatic main line to constitute a control pressure at a pressure control connection of the purge valve can be a hindrance with regard to a residual maintaining pressure, in particular a residual bellows pressure. A necessary residual maintaining pressure can have a restrictive effect if an effective pressure change absorption to regenerate a dryer or a high spring amplitude in an air spring assembly is to be achieved or optimized. The invention is based in particular on the consideration that a measure relating to the residual maintaining pressure, as required in the prior art for the purge functionality of a compressed air supply assembly, can where applicable be a hindrance if a particularly rapid purge functionality is to be achieved. Nonetheless the simple structure of a solenoid valve arrangement with a control valve to control a purge valve in order to maintain a rapid purge functionality should not be excessively complicated or should be kept comparatively simple.

Based on such considerations, according to the invention, it is possible to provide a pressure-maintaining pneumatic device connected to the control line, whereby it is unnecessary to constitute the control pressure from bellows pressure. The invention provides a pressure-maintaining pneumatic device adapted to not only maintain a control pressure at the pressure control connection when the valve connection of the purge valve in the purge line is open, but to maintain this control pressure independently of a pressure in the purge line and the pneumatic main line.

This concept of a pressure-maintaining pneumatic device, which functions independently of a bellows pressure, supports both a comparatively high pressure change amplitude and a rapid purge functionality. Also a pressure-maintaining pneumatic device in the control line, in addition to the solenoid valve arrangement and/or with modification of the solenoid valve arrangement, in particular the control valve, can be achieved comparatively simply and without excessive modification of a conventional solenoid valve arrangement.

Preferably, suitable pressure maintenance is provided in the pressure-maintaining pneumatic device, which preferably can be implemented by a modification of the solenoid valve arrangement and/or using pneumatic components of a peripheral element of the compressed air supply assembly, such as for example a pneumatic assembly. Pressure maintenance in principle means maintaining a constant pressure—that is, a pressure that is independent of the bellows pressure, in particular independent of the pressure in the purge line and the pneumatic main line.

Put simply, according to embodiments of the present invention, the pressure-maintaining pneumatic device is configured to constitute a control pressure at the pressure control connection of the purge valve and provide a constant pressure as a control pressure implemented independently of the bellows pressure. In particular, a pneumatic blocking device is suitable here for blocking the control line after a certain control pressure has been built up, and/or pneumatic sources that can provide a comparatively constant pressure to a control line independently of a bellows pressure.

According to a preferred embodiment, the pressure-maintaining pneumatic device is adapted to maintain a pressure at the pressure control connection when the valve connection of the purge valve in the purge line is open such that a pressure in the purge line and/or the pneumatic main line can fall variably below a residual maintaining pressure. A residual maintaining pressure in particular is a residual pressure that is predefined by a purge valve spring of the purge valve. This allows the control pressure to be adjusted variably, i.e., independently of bellows pressure and in a range below the residual pressure.

This can be used in a further refinement of the invention to allow purging of the compressed air supply assembly down to ambient pressure. Preferably, the pressure-maintaining pneumatic device is adapted to maintain a pressure at the pressure control connection when the valve connection of the purge valve in the purge line is open such that a pressure in the purge line and the pneumatic main line can fall practically to ambient pressure.

According to one embodiment, the pressure-maintaining pneumatic device can be formed with the control valve and a non-return valve. The non-return valve allows a control pressure in the pneumatic control line to be maintained at a suitable level independently of the pressure in the purge line and/or the pneumatic main line. The non-return valve can be connected to the pneumatic main line between the control valve, in particular a first control connection thereof, and a branch connection of the control line, i.e., in the control line. Advantageously, the control line can branch from the pneumatic main line, namely at a branch connection, where the non-return valve is connected between the branch connection and a valve connection of the control valve at which control pressure can be applied. Preferably, a branch connection of this type can be arranged in the pneumatic main line between an air dryer and the compressed air connection to the pneumatic assembly—in particular, between a choke and the compressed air connection. The choke preferably has a nominal width that supports an adequate pressure change amplitude for regeneration of the dryer but nonetheless is sufficiently dimensioned to allow rapid purging.

The control valve can be a 3/2-way valve. Advantageously, a further, in particular a third, valve connection of the control valve is connected to the environment. The further valve connection of the control valve can be formed as a further purge connection to the environment. A further purge line can be connected to the further valve connection, which line leads to the purge line or purge connection.

This embodiment is advantageous in that, e.g., by means of a 3/2-way valve in a first switch position, a control pressure can be built up and maintained at the pressure control connection of the purge valve. The first switch position is a powered switch position of a control valve formed as a solenoid valve. In a second switch position of the control valve, preferably an unpowered, i.e., disconnected switch position of a solenoid valve, the control line is blocked in a part branching from the pneumatic main line and purged in a part connected to the pressure control connection of the purge valve.

According to another embodiment, the pressure-maintaining pneumatic device is formed with the control valve and a pressure accumulator. Advantageously, the control line is connected to the pressure accumulator and/or branches from an accumulator branch line leading to a pressure accumulator. The accumulator branch line and pressure accumulator are preferably components of a pneumatic assembly of the pneumatic system. This has the advantage that a modification to an existing pneumatic line system can be implemented easily or constructed using former pneumatic lines. In particular, the control line is connected to a pressure accumulator and has no connection to the pneumatic main line. A pressure accumulator allows a control pressure to be created with comparatively little complexity, independently of a pressure in the purge line and the pneumatic main line. When the valve connection of the purge valve in the purge line is open, the main line and the purge line, in particular a bellows with variable residual pressure, can be purged to an ambient pressure.

The control valve can be formed as a 3/2-way valve, wherein a further valve connection of the control valve is connected to the environment. The further valve connection of the control valve is advantageously connected to the purge connection to the environment. However, the further valve connection can be produced as a further purge connection.

As a further embodiment, the pressure-maintaining pneumatic device can be formed with the control valve itself. The control valve can be modified comparatively easily, in particular by deviation away from a 3/2-way valve. The advantages of a 3/2-way valve as a control valve can be waived in favor of a simplified mechanical design of the control valve. In particular, the control valve can have two valve connections that are connected in the control line. Preferably, the control valve has no valve connection to the environment. The control valve is formed as a 2/2-way valve in this embodiment. This embodiment leverages the fact that the control line can also be purged into the pneumatic main line and via the air dryer.

An electromagnetic functionality and/or a control process for the control valve can be extended in an improved manner to form an advantageous pressure-maintaining pneumatic device. Advantageously, the control valve can be formed electromagnetically interval-controllable. This means that opening and closing of the control valve takes place in close temporal succession—in particular initiated by a control pulse pair; for example, a combination of a connect and disconnect process for a current to a magnetic coil—namely, such that a sufficient control pressure can be built up at the pressure control connection of the purge valve and immediately thereafter the second part of the control line connected to the control connection can be closed. As part of such control, known as interval control functionality, of the control valve, e.g., of the 2/2-way valve—again independently of the pressure in the purge line and the pneumatic main line—a control pressure can be maintained at the pressure control connection of the purge valve when the valve connection of the purge valve is opened.

By means of the electromagnetic interval control functionality, at the start of a control interval, to build up the control pressure at the pressure control connection of the purge valve into the control line, the two valve connections of the control valve must be opened; at the end of the control interval, to maintain the control pressure at the pressure control connection, the two valve connections must be closed. Put simply, the control valve, preferably in the form of a 2/2-way valve, is formed as a solenoid valve and is controlled by means of a control pulse pair delimiting the control interval such that the control valve opens at the start of the control interval and closes at the end of the control interval. The duration of a control interval should be just sufficient to build up the control pressure and can preferably lie substantially below 1 second.

The control line can be connected to a pressure accumulator. It can branch preferably directly from an accumulator branch line leading to the pressure accumulator.

Alternatively, the control line can be connected to a bellows; in particular, it can be branched preferably directly from a bellows branch line leading to a bellows.

The control line can alternatively be connected to an air compressor; in particular, directly to the air compressor and/or to a branch line connected to the air compressor. The control line can also branch directly from the pneumatic main line. Via the main line, the pressure amplitude of an air compressor, i.e., from the compressed air supply, can be used to build up a defined controlled pressure. Here, various additional advantageous possibilities arise for defining the control pressure situation-dependently, for example by a predefined establishment of the interval length of the control interval and/or the compressor activity.

It should be appreciated that the embodiments discussed above can variously be implemented alone or in combination.

Still other objects and advantages of the present invention will in part be obvious and will in part be apparent from the specification.

The present invention accordingly embodies features of construction, combinations of elements, arrangement of parts, and the various steps and the relation of one or more of such steps with respect to each of the others, all as exemplified in the following detailed disclosure, and the scope of the invention will be indicated in the claims.

BRIEF DESCRIPTION OF THE DRAWINGS

For a fuller understanding of the inventive embodiments, reference is had to the following description taken in connection with the accompanying drawings in which.

LIST OF REFERENCE NUMERALS

0 Air supply connection
1 Compressed air supply
2 Compressed air connection
3, 3' Purge connection
10, 10', 10" Compressed air supply assembly
20 Air supply line
21 Compressor unit
21.1 Compressor
21.2 Electric motor
22 Air supply
23 Filter
24.1, 24.2 Non-return valve
40 Databus
41, 47 Power lines
42 Relay
43, 46 Electrical control lines
44, 45, 48 Sensor lines
50 Plug connection
60 Pneumatic main line
61 Air dryer
62 Choke
63 Branch connection of pneumatic main line
70 Purge line
71 Purge valve
72 Purge valve spring
73 Further purge line
74 Relay pressure limiter
80 Solenoid valve assembly
81, 81', 81" Control valve
82 Control valve spring
90, 90', 90" Pneumatic assembly
91 Bellows
91L Bellows branch line
92 Pressure accumulator
92L Accumulator branch line
93, 93.S Directional valve
94 Pressure sensor
95 Gallery
96 Further pneumatic line
97 Height sensors
98 Valve block
99 Bellows pressure sensor
100, 100', 100" Pneumatic system
110 Pneumatic control line
110.1, 110.2, 110.3 First, second, third part of pneumatic control line 110
111 Non-return valve
120 Pressure-maintaining pneumatic device
200 Vehicle superstructure
210 Front axle
220 Rear axle
1000 Vehicle
X, Y Valve connection
X1, Y1 First, second purge valve connection
X2, Y2 First, second control valve connection
Z2 Third control valve connection

DETAILED DESCRIPTION OF THE PREFERRED EMBODIMENTS

Figure 1:
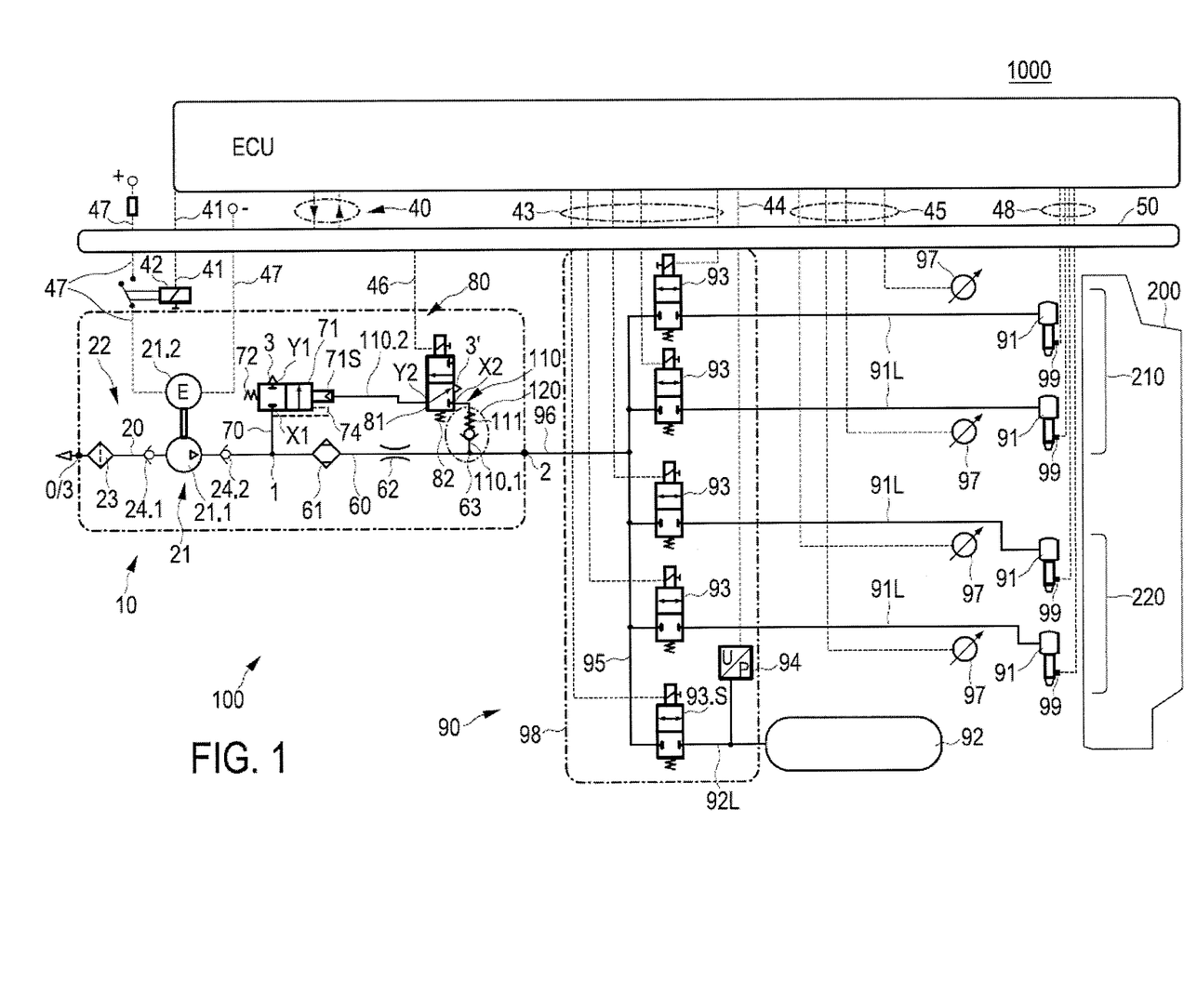
FIG. 1 depicts a pneumatic system with a compressed air supply assembly and a pneumatic assembly in accordance with an exemplary embodiment of the present invention, wherein the compressed air supply assembly is fitted with a solenoid valve arrangement with a control valve to control a purge valve, and wherein a pressure-maintaining pneumatic device is provided in the control line as a combination of the control valve with a non-return valve.

Referring now to the drawing figures, FIG. 1 shows a pneumatic system 100 with a compressed air supply assembly 10 and a pneumatic assembly 90 for a vehicle 1000 indicated symbolically. The pneumatic system 100 is connected for control purposes to an ECU, as an electronic vehicle controller, via a plug connection 50 and a databus 40, wherein various electrical control and sensor lines or power lines, designated 41, 42, 43, 44, 45, 46, 47, 48, are provided for the compressed air supply assembly 10, pneumatic assembly 90, and sensors and relay circuit.

In concrete terms, for monitoring and control of the pneumatic system 100, the ECU is connected via the data bus 40 and the electrical control and sensor lines and a plug connection 50; the electrical control lines include first electrical control lines 43 for powering magnetic coils of the solenoid directional valves 93 in the pneumatic assembly 90, and a second electrical control line 46 for powering the magnetic coil of a control valve 81, 81', 81" in the form of a solenoid directional valve of a solenoid valve assembly 80 in the compressed air supply assembly 10, 10', 10". The first electrical control lines 43 serve to supply control power to the bellows and accumulator valves, formed as solenoid valves, in the form of directional valves 93, 93.S. The second electrical control line 46 serves to supply control power to the control valve 81, 81', 81" formed as a solenoid valve.

In addition, first electrical sensor lines 45 are provided to height sensors 97 in the pneumatic assembly 90 and a second electrical sensor line 44 to a pressure sensor 94 in the accumulator branch line 92L to a pressure accumulator 92. The first electrical sensor lines 45 are connected to the height sensors 97. The second electrical sensor line 44 is connected to the pressure sensor 94, which measures a pressure of the pressure accumulator 92 in the accumulator branch line 92L. In addition, third electrical sensor lines 48 can also be provided to the bellows pressure sensors 99.

Also, power lines 47 are provided for other electromagnetic components such as the power line 47 with a relay 42 to operate the electric motor 21.2 of a compressor unit 21, and an electrical control line 41 to relay 42. The electric motor 21.2 can be controlled via the power line 47 serving as an electrical switch line, the electrical control line 41 and the controllable relay 42.

Both this arrangement and that described below for structuring the pneumatic system with the compressed air supply assembly 10 and pneumatic assembly 90 also apply to the embodiments of a pneumatic system 100, 100', 100" shown in FIGS. 1, 2 and 3 with compressed air supply assembly 10, 10', 10" and/or pneumatic assembly 90, 90', 90". For the sake of simplicity, the same reference numerals are used below for identical or similar features or parts of identical or similar function, wherever useful and suitable, but it should be understood that different variants of components and elements can be used for the compressed air supply assemblies 10, 10', 10" or pneumatic assemblies 90, 90', 90".

FIG. 1 shows the compressed air supply assembly 10 for operating the pneumatic assembly 90, which, in this embodiment, is an air spring assembly of a vehicle superstructure 200 of vehicle 1000, indicated symbolically with front axle 210 and rear axle 220. The compressed air supply assembly 10 has a compressed air supply 1 and a compressed air connection 2, wherein compressed air can be supplied to the compressed air supply 1 via an air supply 22. The compressed air can be guided in the filling direction between the compressed air supply 1 and the compressed air connection 2 via a pneumatic main line 60 and supplied to the pneumatic assembly 90. For this, an air connection 0 provided for air intake, a filter 23 and a compressor unit 21, are arranged in the air supply 22 in the air supply line 20. The compressor unit 21 is arranged between a first and a second non-return valve 24.1, 24.2, wherein a compressor 21.1 in the compressor unit 21 can be driven via an electric motor 21.2.

The pneumatic main line 60 includes an air dryer 61 and a choke 62. A purge line 70 branches from the pneumatic line 60 to the compressed air supply 1 and continues via a purge valve 71 to a purge connection 3. The purge connection 3 is formed directly with a second purge valve connection Y1 of the purge valve 71 on the purge side. The first purge valve connection X1 on the pressure side, opposite the second purge valve connection Y1 of the purge valve 71, is connected to the purge line 70. The purge valve 71 is formed as a 2/2-way relay valve, which has a pressure control connection 71S. The purge valve has a first purge valve connection X1, which is connected to the compressed air supply 1 via the purge line 70. The second purge valve connection Y1 is formed as a purge connection 3 or can be connected to a purge connection 3.

Also, a pressure limiter 74, in particular relay-operated, is provided on the purge valve 71 such that the pressure for opening the purge valve 71 is limited by drawing off a pressure in the purge line 70 via the pressure limiter 74. In this way, even at a comparatively high operating pressure, a degree of variability or tolerance can be achieved with regard to a pressure limitation. Most advantageous is a power-controlled pressure limiter 74, which, here, is implemented by the switch point of the purge valve 71 being adjustable variably depending on the current intensity of a control current for the control valve 81. This means that the current intensity in the magnet part (coil) in the control valve 81 determines the switching point of the pneumatic part (purge valve 71 as relay valve). Depending on vehicle situation, the system temperature or other pressure-relevant system parameters, the switch point of the pneumatic part, i.e., the purge valve 71 formed as a relay valve, can be set variably with the active current intensity. The pressure limiter 74, which is current-controlled, ensures that the gallery pressure does not exceed the static opening pressure of a bellows valve, formed as a solenoid valve, in the form of a directional valve 93 (also called a level control valve) and an internal pressure of a bellows 91. The pressure can also be measured in the gallery 95 at an accumulator 92, namely via the pressure sensor 94.

A solenoid valve arrangement 80 is provided with control valve 81 as a solenoid valve to control a purge valve 71 as a relay valve. The control valve 81 is here connected with a first valve connection X2 and a second control valve connection Y2 in a pneumatic control line 110. The first control valve connection X2 is connected to the branch connection 63 of the pneumatic main line 60 via a first part 110.1 of the pneumatic control line 110. The second control valve connection Y2 is connected to the pressure control connection 71S of the purge valve 71 via a second part 110.2 of the pneumatic control line 110. The third control valve connection Z2 of the control valve 81 is formed as a further purge connection 3' to the environment. In a derivation, the purge connection 3' can also be connected with the purge connection 3 to the environment via a further purge line—not shown in FIG. 1—or, for example, also to the air supply connection 0 via the air supply line 20 and filter 23.

The pneumatic assembly 90 comprises, arranged in a valve block 98, five level control valves formed as bellows or accumulator valves in the form of a directional valve 93, namely in the form of a solenoid directional valve—a 2/2-way solenoid valve. In the valve block 98, the bellows or accumulator valves 93 formed as solenoid directional valves are connected together via a gallery 95, wherein the gallery 95 is connected via a further pneumatic line 96 to the pneumatic line 60 via the compressed air connection 2. The bellows 91 or pressure accumulator 92 is connected via bellows branch lines 91L or an accumulator branch line 92L to the bellows or accumulator valves, i.e., directional valves 93, 93.S. The directional valves 93, 93.S serving as bellows or accumulator valves are connected upstream of the bellows 91 or pressure accumulator 92 so that they can block against the gallery 95 or open to the gallery 95. A height sensor 97 is allocated to each bellows 91. Data from sensor 97 can be transmitted to the ECU via a sensor line 45 and the plug connection 50 or databus 40.

To operate the pneumatic assembly 90—depending on the height level measured—the bellows 91 forming air springs can be filled with compressed air from the compressed air supply assembly 10 via the compressed air connection 2; this then serves to raise the level of the vehicle superstructure 200. Conversely, the air bellows 91 can be purged to a purge connection 3 in the opposite direction via the compressed air connection 2 so that the level of the vehicle superstructure 200 falls under the escape of compressed air from the bellows 91. To fill the pneumatic assembly 90 via the compressed air connection 2, the purge valve 71 is in the unpowered, closed state against the purge connection 3 as shown in FIGS. 1, 2 and 3. Also the first and second control valve connections X2, Y2 are pneumatically separated, i.e., the first part 110.1 of the pneumatic control line 110 is closed against the second part 110.2 of the pneumatic control line 110; this leads to the uncontrolled, closed position of the purge valve 71.

To purge the pneumatic assembly 90, a suitable current is supplied to the magnetic coil of the control valve 81 by means of a current signal carried via the electrical control line 46. As a result, the magnetic coil of the control valve 81 is powered and opened against the spring pressure of the control valve spring 82. Thus, the pneumatic control line 110 is opened via the control valve 81, i.e., the first part 110.1 of the pneumatic control line 110 with the second part 110.2 of the pneumatic control line 110 is opened to the pressure control connection 71S. A control pressure present in the pneumatic control line 110 is built up at the pressure control connection 71S and acts against the force of the purge valve spring 72 of the purge valve 71, so that finally the first purge valve connection X1 is opened to the second purge valve connection Y1 of the purge valve 71. Thus, the purge line 70 and an output of the air dryer 61 are opened to the purge connection 3. With valve connections X1, Y1 of the purge valve 71 in the purge line 70 opened in this way, control pressure is maintained at the pressure control connection 71S, already because of the pressure present in the bellows 91, which is present in the pneumatic main line 60 when the directional valve 93, 93.S, i.e., the bellows or accumulator valve is open, and hence available as a control pressure in the pneumatic control line 110.

In addition, according to the embodiments described below, when the valve connections X1, Y1 of the purge valve in the purge line 70 are open, control pressure is maintained at the pressure control connection 71S; this is independent of a pressure in the purge line 70 and the pneumatic main line 60. In particular, by means of a pressure-maintaining pneumatic device 120 discussed herein with reference to FIGS. 1-3, the control pressure can be maintained, although a pressure in the purge line and pneumatic main line 60 falls below a residual maintaining pressure, i.e., a pressure predefined by the purge valve spring 72 of the purge valve 71. For this, the necessary control pressure in the pneumatic control line 110 can be selected variably, in particular adjusted variably, via the purge valve spring 72 of the purge valve 71. Thus, according to all embodiments described below, it is guaranteed that the pressure in the purge line 70 and the pneumatic main line 60 can fall practically to an ambient pressure so that the bellows 91 can be purged to ambient pressure.

For this, the embodiment depicted in FIG. 1 provides, in the pneumatic control line 110, namely in the first part 110.1 of the pneumatic control line 110, a non-return valve 111 between the branch connection 63 and the first control valve connection X2 of the control valve 81.

Figure 2:
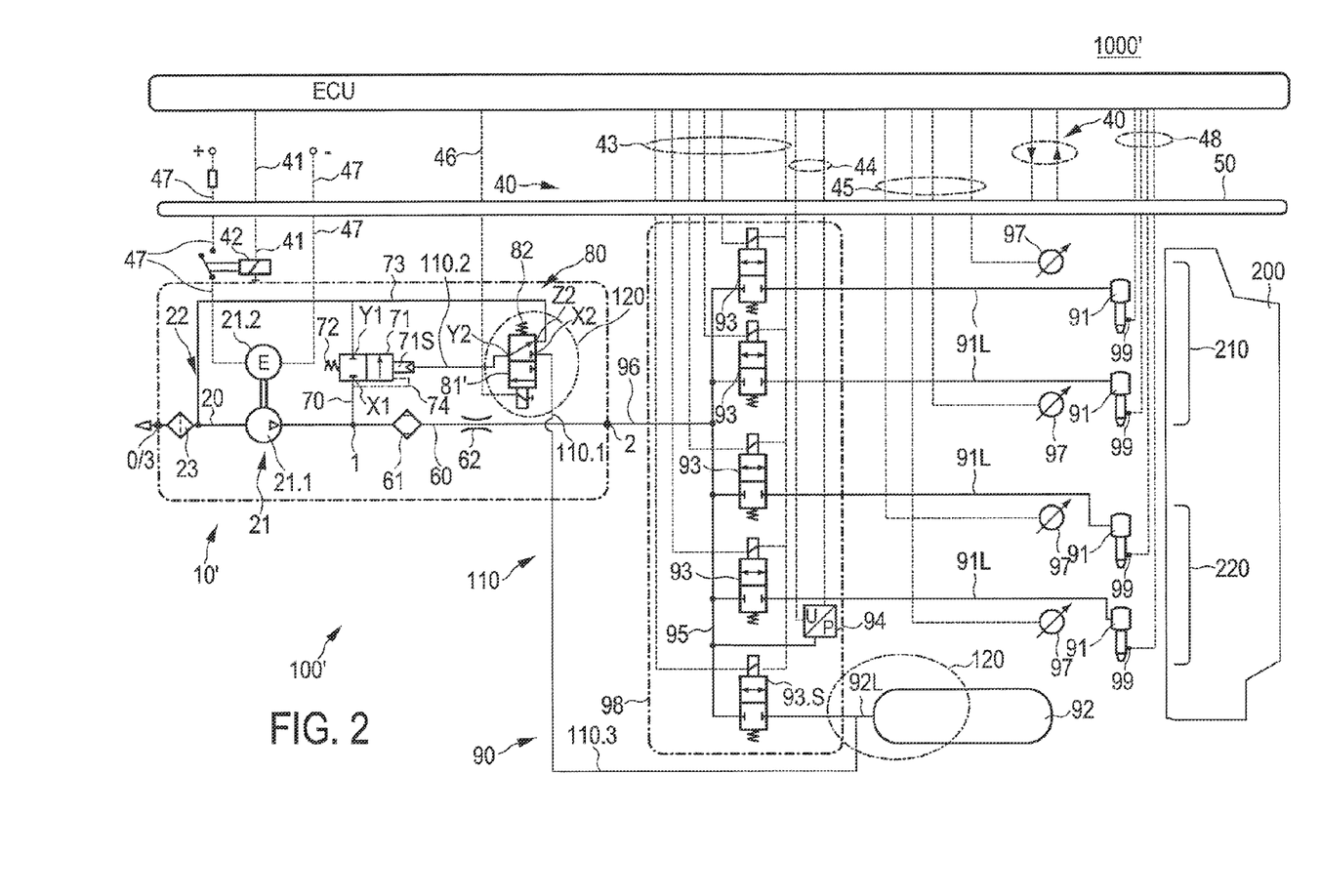
FIG. 2 depicts a pneumatic system with a compressed air supply assembly and a pneumatic assembly in accordance with another embodiment of the present invention, wherein the compressed air supply assembly is provided with a solenoid valve arrangement with a control valve to control a purge valve, and wherein a pressure-maintaining pneumatic device is formed as a combination of the control valve with a pressure accumulator of the pneumatic assembly.

For this, the embodiment shown in FIG. 2 provides that the pneumatic control line 110 is not connected to the pneumatic main line 60, but rather continues after the first part 110.1 into a third part 110.3 up to an accumulator branch line 92L and is connected there, i.e., connected to a pressure accumulator 92.

Figure 3:
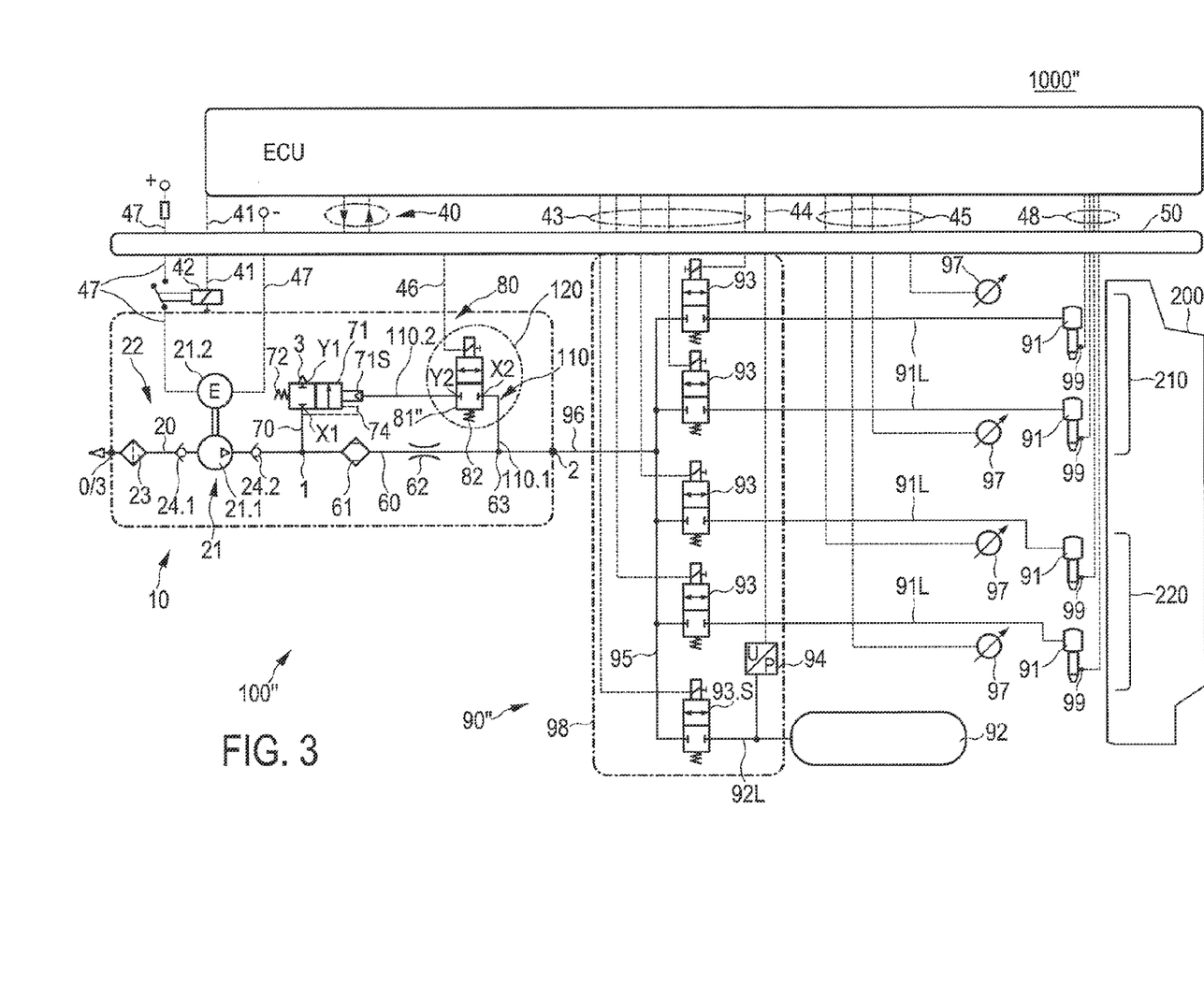
FIG. 3 depicts a pneumatic system with a compressed air supply assembly and a pneumatic assembly according to a further embodiment of the present invention, wherein a solenoid valve arrangement is provided with a control valve to control a purge valve, and a pressure-maintaining pneumatic device is formed by means of a modified control valve in the form of a 2/2-way valve with an electromagnetic, interval control functionality such that the 2/2-way valve can be opened briefly to build up and then maintain the control pressure, and then be closed.

For this, the embodiment shown in FIG. 3 provides that the control valve 81 is modified in the form of a 2/2-way valve shown in FIG. 3, the operation of which is described in more detail with reference to FIG. 4.

With reference to FIG. 1, for purging, the coil of the control valve 81 formed as a 3/2-way valve is powered and the control valve 81 transfers from the unpowered state shown in FIG. 1 to the powered state in which the first control valve connection X2 is pneumatically connected with the second control valve connection Y2; i.e., the first part 110.1 of the pneumatic control line 110 and the second part 110.2 of the pneumatic control line 110 are connected together to the pressure control connection 71S. The 3/2-way valve is thus switched to open the control valve 81 in the pneumatic control line 110. With the valve connections X1, Y1 of purge valve 71 in purge line 70 opened, control pressure is maintained at the pressure control connection 71S already because of the pressure present in the bellows 91, which, with an open level control valve, i.e., directional valve 93 serving as bellows or accumulator valve, is present in the pneumatic main line 60 and thus available as a control pressure in the pneumatic control line 110. The non-return valve 111 shown in FIG. 1, in the first part 110.1 of the pneumatic control line 110 serving as a pre-control channel, maintains the control pressure once fed into the pneumatic control line 110 at a constant level so that the relay piston of the purge valve 71 remains actuated as a result of the control pressure maintained at the pressure control connection 71S, even independently of a pressure in the purge line 70 and pneumatic main line 60, and the purge valve 71 in the purge line 70 remains open. In this way, the pneumatic assembly 90 can purge the dryer 61 and finally the purge line 70 to the purge connection 3 via the choke 62. For this, the nominal width of the choke 62 is designed in a size advantageous for regeneration of the air dryer 61.

To end the purge process switched in this way, first the bellows valve formed here as a solenoid directional valve 93 is closed and the power to the magnetic coil of the control valve 81, formed as a 3/2-way valve, is switched off so that the valve returns under the effect of the control valve spring 82 into the unpowered switched state shown in FIG. 1. The 3/2-way valve falls back into its state shown in FIG. 1, and the third control valve connection Z2 and the second control valve connection Y2 of the 3/2-way valve are connected together pneumatically to open the control valve 81 in the pneumatic control line 110. Thus, the pre-control channel, in particular the second part 110.2 of the pneumatic control line 110, is purged to ambient pressure and the purge valve spring 72 of the purge valve 71 closes the relay piston so that the purge valve 71 falls back into the unpressurized state shown in FIG. 1 and closes the purge line 70, i.e., separates the first purge valve connection X1 and the second purge valve connection Y1 in the purge line 70.

The embodiment shown in FIG. 2 uses the storage pressure available in the pressure accumulator 92 and can feed this via the accumulator branch line 92L and the third part 110.3 of the pneumatic control line 110 into the pneumatic line 110 serving as pre-control channel. Thus, a sufficient control pressure is present at the pressure control connection 71S of the purge valve 70 to open the relay piston of the purge valve 71. The embodiment shown in FIG. 2 thus advantageously uses a pressure accumulator 92 present in pneumatic systems 100'. In principle, the pressure accumulator 92 shown in FIG. 2 can also be understood symbolically insofar as this can stand for any type of a constant pressure source or be replaced by any type of pressure source that is capable of building up a control pressure that can then be maintained independently of a pressure in the purge line 70 and the pneumatic main line 60. For this, for example, an air compressor 21 can also be used. Thus, for example in the case of low system pressures, where applicable also in the case of a low pressure in the pressure accumulator 92, by brief activation of the air compressor 21 the necessary control pressure can be made available via the compressed air supply. In the embodiment shown in FIG. 2, for example, a suitable pressure can be built up again in the pressure accumulator 92 by activating the air compressor 21. For this, the directional valve 93.S serving as an accumulator valve in the accumulator branch line 92L must be opened. In this case, on activation of the air compressor 21 from the compressed air supply, the activity of the compressor 21.1 fills both the pressure accumulator 92 and the pre-control channel in the form of the pneumatic control line 110 with sufficient control pressure. Advantageously, a pressure sensor 94 can be provided in order to make available via a suitable sensor line 44 a signal to the ECU, in any case at the plug connection 50 and any other databus 40, indicating the pressure in the pressure accumulator 92. Thus, a pressure-dependent control of the air compressor 21 can be achieved to constitute a control pressure in the pneumatic control line 110. At sufficiently high pressures, for example above a threshold pressure, the air compressor 21 can remain inactivated since a suitable control pressure is made available in the pneumatic control line 110 from the pressure accumulator 92. If a pressure in the system lies below a threshold pressure, at such low pressures the air compressor 21 can be briefly activated and the pressure accumulator 92 raised to an adequate pressure level via a directional valve 93.S serving as an accumulator valve, in order to provide sufficient control pressure to activate the relay piston of the purge valve 71.

In the state shown in FIG. 2, the control valve 81 is in an unpowered state so that the first control valve connection X2 is pneumatically separated from the second control valve connection Y2, and sufficient control pressure is present at the first control valve connection X2 in the first and third parts 110.1, 110.3 of the pneumatic control line 110.

To initiate a purge process, the control valve 81 is switched into a powered state by powering the magnetic coil via the electrical control line 46. In other words, the further purge line 73 is pneumatically connected to the third control valve connection Z2, and the first control valve connection is opened to the second control valve connection X2, Y2 so that a first, second and third part 110.1, 110.2, 110.3 of the pneumatic control line 110 are pneumatically connected together and consequently the control pressure is present at the pressure control connection 71S. Thus, the relay piston of the purge valve 71 is opened against the spring pressure of the purge valve spring 72 of the purge valve 71, i.e., the first purge valve connection and the second purge valve connection X1, Y1 of the purge valve 71 are connected together pneumatically so that the purge line 70 to the purge connection 3 is opened. To end the purge process, the power to the magnetic coil of the control valve 81 is switched off and this returns to the unpowered state shown in FIG. 2. As the second part 110.2 of the pneumatic control line 110 is purged via the further purge line 73 to the purge connection 3, consequently the relay piston of the purge valve 71 closes again under the pressure of the purge valve spring 72 and separates the valve connections X1, Y1 in the purge valve 71. In this state, the valve connections X2, Y2 of the control valve 81 are separated and maintain the control pressure of the pressure accumulator 92.

FIG. 3, which depicts a preferred embodiment for the formation of a pressure-maintaining pneumatic device 120, shows a control valve 81" designed as a 2/2-way valve. To purge the bellows 91, the 2/2-way solenoid valve is opened by powering the magnetic coil for a specific duration and then closed again by disconnection of the power, i.e., the control valve 81" is controlled by means of a control pulse pair delimiting the control interval, for example opened by a double pulse, via the electrical control line 46 for a control interval of a specific interval duration sufficient to build up a control pressure in the second part 110.2 of the pneumatic control line 110 at the pressure control connection 71S. As the control valve 81" is only open during the control interval and is then closed again, the control pressure in the pre-control channel of the pneumatic control line 110, i.e., in the second part 110.2 of the pneumatic control line 110, can be maintained at the initial pressure level. The relay piston of the purge valve 71 then remains open against the spring pressure of the purge valve spring 72 of the purge valve 71.

To end the purge process, first the directional valves 93 serving as bellows valves are closed. As a result the pressure in the dryer 61 falls to ambient pressure, i.e., atmospheric pressure. The 2/2-way valve as control valve 81" is then opened; preferably also only for a specific interval duration. In other words, for the purge process too, the control valve 81" in the form of a 2/2-way valve is opened by a control pulse pair delimiting a control interval, for example a double pulse, via the electrical control line 46 for a specific interval duration. The pressure in the pre-control channel, i.e., in the pneumatic control line 110, diminishes due to the relatively large air dryer volume of the air dryer 61 and the purge valve spring 72 can close the relay piston of the purge valve 71 against ambient pressure during the open state of the 2/2-way valve in the control interval. To end the purge process and for example convert an inactivated state of the air dryer assembly 10" or for a filling process, the control interval is initiated by a further closure of the 2/2-way valve at the end of the interval duration. As a result, the pneumatic control line 110 is closed against the pneumatic main line 60; i.e., the first part 110.1 of the pneumatic control line 110 is pneumatically separated from the second part 110.2 of the pneumatic control line 110 in the unpowered closed state of the control valve 81" in the form of the 2/2-way valve.

The embodiment shown in FIG. 3 is not restricted to a line routing in the pneumatic assembly to the pneumatic control line 110, i.e., similar to FIG. 1. Rather, a line routing can also be provided between the pressure accumulator 92 and the pneumatic control line 110, i.e., as in FIG. 2, with a third part 110.3 of the pneumatic control line 110 between the accumulator branch line 92L and the pneumatic control line 110, wherein this can then be connected to the pneumatic main line 60.

Figure 4:
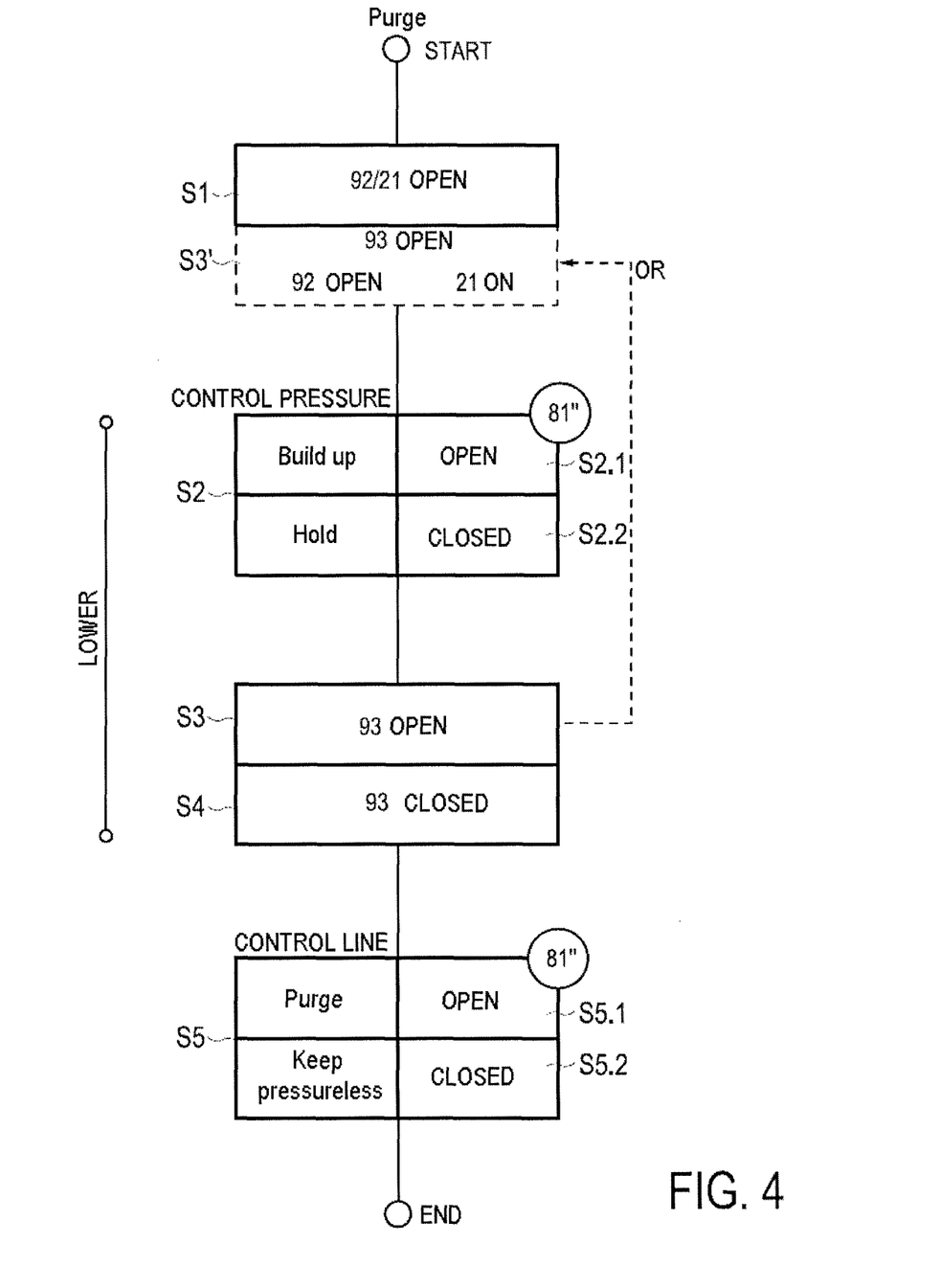
FIG. 4 illustrates an exemplary purge process for a compressed air supply assembly according to the embodiment of the present invention depicted in FIG. 3 utilizing a control valve in the form of a 2/2-way valve.

FIG. 4 illustrates the fundamental course of a purge process for a compressed air supply assembly 10" of FIG. 3 by means of a control valve 81" in the form of a 2/2-way valve. First, in a first step S1, the compressor 21 is activated and the air dryer 61 and the control line are pneumatically charged. To initiate a purge process, in first step S1 it can also be ensured that the pressure accumulator 92 has adequate system pressure sufficient to provide a control pressure in the pneumatic control 110 or at the pressure control connection 71 of the purge valve 71. For this, where applicable, the pressure accumulator 92 can be charged by activating the compressor 21; the accumulator valve in the form of a directional valve 93.S connected upstream of the pressure accumulator 92 is opened; and directional valve 93.S assumes the state OPEN.

The purge phase is then initiated by an electromagnetic interval-control step S2 at the control valve 81" by building up—S2.1; control valve 81" and where applicable directional valve 93.S assume the state OPEN—and maintaining—S2.2; control valve 81" and where applicable directional valve 93.S assume the state CLOSED—a control pressure also in the second part 110.2 of the pneumatic control line 110 at the pressure control connection 71S. For this, in a first state S2.1, at the start of the interval and to build up the control pressure at the pressure control connection 71S, the first and second control valve connections X2, Y2 of the control valve 81" are opened, i.e., connected together pneumatically—namely by means of a first pulse of an electromagnetic double pulse at the magnetic coil of the control valve 81". After expiry of a predetermined interval duration, to end the interval and to maintain control pressure at the pressure control connection 71S, the power to the control valve 81" is switched off—namely by means of a second pulse of an electromagnetic double pulse. Consequently, control valve 81" returns to the unpowered state shown in FIG. 3 and the second control valve connections X2, Y2 are separated; i.e., in step S2.2 the control valve 81" is in the closed state.

The relay piston of the purge valve 71 opens, and by opening of the directional valves 93 serving as bellows valves in step S3, the purge process can be initiated—S3; directional valve 93 assumes the state OPEN. The purge process is ended in a step S4 by closing the directional valves 93 serving as bellows valves—S4; directional valve 93 assumes the state CLOSED.

In a derived method also shown in FIG. 4 in dotted lines, step S3 can also be carried out as step S3' before step S2. In this case, the directional valves 93 serving as bellows valves are already open before the interval control functionality of the control valve 81" of step S2 is performed—S3'; directional valve 93 assumes the state OPEN. In this case, the control pressure is built up fully or partly with bellows pressure; the control pressure where applicable is ensured additionally—independently of a pressure in the purge line 70 and/or the pneumatic main line 60—either by switching on the pressure accumulator 92 or by briefly switching on the compressor 21—S3'; directional valve 93.S assumes the state OPEN. In this case too an interval control functionality for the control valve 81" leads to the build-up and maintenance of the control pressure as explained with reference to step S2.

After ending the purge process in step S4, finally in step S5 by a further interval control of the control valve 81" in the form of the 2/2-way valve, the second part 110.2 of the pneumatic control line 110, i.e., the pressure control connection 71S, is pressure-relieved or set to ambient pressure. For this, the second part 110.2 or the entire pneumatic control line 110 is purged in step S5.1 by opening the first and second control valve connections X2, Y2 of control valve 81" at the start of the interval control functionality; i.e., control valve 81" is briefly powered and transfers into the powered state; the pressure contained in the second part 110.2 can escape via the air dryer 61 in the pneumatic main line 60 and the choke 62—S5.1; control valve 81" assumes the state OPEN. After a predetermined interval duration, in step S5.2 the power to control valve 81" is switched off and this returns to the unpowered state shown in FIG. 3 and thus closes the first part 110.1 against the second part 110.2 of a pneumatic control line 110. The relay piston of the purge valve 71 is then at switch pressure, which lies above ambient pressure, and the purge valve spring 72 of the purge valve 71 closes this into the uncontrolled state shown in FIG. 3, so that the purge line 70 is closed as a result of the pneumatically separated first and second purge valve connections X1, Y1—S5.2; control valve 81" assumes the state CLOSED. The purge process is thus ended and can be repeated again from step S1. At the start of step S2.1 until the end of step S4, a lowering of the vehicle superstructure 200 is implemented because of the air volume escaping from the bellows 91, for example, for the front axle 210 and/or the rear axle 220.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

What is claimed is:
1. A compressed air supply assembly for operating a pneumatic assembly, the compressed air supply assembly comprising:
 a compressed air supply;
 a compressed air connection to the pneumatic assembly;
 a purge connection to the environment;
 a pneumatic main line between the compressed air supply and the compressed air connection, the pneumatic main line including an air dryer;
 a purge line between the compressed air connection and the purge connection;
 a solenoid valve arrangement including a control valve to control a purge valve, the control valve being connected to a control valve connection in a pneumatic control line connected to a pressure control connection of the purge valve, and the purge valve being connected to a purge valve connection in the purge line; and
 a pressure-maintaining pneumatic device connected to the pneumatic control line, the pressure-maintaining device being adapted to maintain control pressure at the pressure control connection when the purge valve connection of the purge valve in the purge line is open independently of pressure in at least one of the purge line and the pneumatic main line.

2. The compressed air supply assembly as claimed in claim 1, wherein the pressure-maintaining pneumatic device is adapted to maintain pressure at the pressure control connection when the purge valve connection of the purge valve in the purge line is open such that pressure in at least one of the purge line and the pneumatic main line is variably selectable, including below a residual maintaining pressure.

3. The compressed air supply assembly as claimed in claim 2, wherein the purge valve includes a variably adjustable purge valve spring to predefine the residual maintaining pressure.

4. The compressed air supply assembly as claimed in claim 1, wherein the pressure-maintaining pneumatic device is adapted to maintain pressure at the pressure control connection when the purge valve connection of the purge valve in the purge line is open such that pressure in at least one of the purge line and the pneumatic main line can fall to about ambient pressure.

5. The compressed air supply assembly as claimed in claim 1, wherein the pressure-maintaining pneumatic device is formed with the control valve and a non-return valve, which are connected in the pneumatic control line.

6. The compressed air supply assembly as claimed in claim 5, wherein the non-return valve is connected between the pneumatic main line and the control valve connection of the control valve.

7. The compressed air supply assembly as claimed in claim 5, wherein the pneumatic control line branches from the pneumatic main line at a branch connection, and wherein the non-return valve is connected between the branch connection and the first control valve connection of the control valve.

8. The compressed air supply assembly as claimed in claim 1, wherein the pneumatic control line branches from the pneumatic main line at a branch connection.

9. The compressed air supply assembly as claimed in claim 8, wherein the branch connection is arranged between the air dryer and the compressed air connection.

10. The compressed air supply assembly as claimed in claim 8, wherein the branch connection is arranged between a choke and the compressed air connection.

11. The compressed air supply assembly as claimed in claim 1, further comprising a further control valve connection of the control valve connected to the environment, and wherein the control valve is a 3/2-way valve.

12. The compressed air supply assembly as claimed in claim 11, wherein the further control valve connection is a further purge connection.

13. The compressed air supply assembly as claimed in claim 1, further comprising a pressure accumulator, and wherein the pressure-maintaining pneumatic device is formed with the control valve and the pressure accumulator.

14. The compressed air supply assembly as claimed in claim 1, wherein the pneumatic control line is connected to a pressure accumulator.

15. The compressed air supply assembly as claimed in claim 14, wherein the pneumatic control line branches from an accumulator branch line leading to the pressure accumulator.

16. The compressed air supply assembly as claimed in claim 1, wherein the pneumatic control line is separate from the pneumatic main line.

17. The compressed air supply assembly as claimed in claim 1, wherein the pressure-maintaining pneumatic device is formed only with the control valve, wherein the control valve includes a first and a second control valve connection, which are connected in the pneumatic control line, and wherein the control valve is a 2/2-way valve with no valve connection to the environment.

18. The compressed air supply assembly as claimed in claim 17, wherein the control valve is electromagnetically interval-controllable such that, at the start of an interval, to build up a control pressure at the pressure control connection, the first and the second control valve connections are opened, and to end the interval, to maintain the control pressure at the pressure control connection, the first and the second control valve connections are closed.

19. The compressed air supply assembly as claimed in claim 1, wherein the pneumatic control line is connected to at least one of an air compressor and a bellows.

20. A pneumatic system, comprising the compressed air supply assembly as claimed in claim 1; and a pneumatic assembly, the pneumatic assembly being an air spring assembly comprising a gallery and at least one branch line pneumatically connected to the gallery, the at least one branch line including at least one of a bellows and a pressure accumulator, and a directional valve arranged before the at least one of the bellows and the pressure accumulator.

21. The compressed air supply assembly as claimed in claim 1, wherein the pneumatic assembly is an air spring assembly of a vehicle.

22. A method for controlling a compressed air supply assembly for operating a pneumatic assembly, wherein the compressed air supply assembly comprises:
a compressed air supply,
a compressed air connection to the pneumatic assembly,
a purge connection to the environment,
a pneumatic main line between the compressed air supply and the pressure connection, the pneumatic main line including an air dryer,
a purge line between the compressed air connection and the purge connection,
a solenoid valve arrangement including a control valve to control a purge valve, the control valve being connected to a control valve connection in a pneumatic control line connected to a pressure control connection of the purge valve, and the purge valve being connected to a purge valve connection in the purge line;
the method comprising:
connecting a pressure-maintaining pneumatic device to the pneumatic control line,
building up control pressure at the pressure control connection of the purge valve,
opening the purge valve connection of the purge valve into the purge line, and
maintaining the control pressure at the pressure control connection of the purge valve when the purge valve connection is open independently of pressure in at least one of the purge line and the pneumatic main line.

23. The method as claimed in claim 22, wherein the pressure-maintaining pneumatic device is formed with the control valve, wherein the control valve comprises a first and a second control valve connection, which are connected in the pneumatic control line, and the control valve is a 2/2-way valve with no valve connection to the environment, the method further comprising effecting electromagnetic interval-control of the control valve by opening the first and the second control valve connections at the start of an interval to build up control pressure at the pressure control connection, and closing the first and the second control valve connections to end the interval and to maintain the control pressure at the pressure control connection.

24. The method as claimed in claim 22, wherein the pneumatic assembly is an air spring assembly of a vehicle.

* * * * *